US 9,697,830 B2

(12) United States Patent
Kingsbury et al.

(10) Patent No.: US 9,697,830 B2
(45) Date of Patent: *Jul. 4, 2017

(54) METHOD AND SYSTEM FOR ORDER-FREE SPOKEN TERM DETECTION

(71) Applicant: International Business Machines Corporation, Armonk, NY (US)

(72) Inventors: Brian E. D. Kingsbury, Cortlandt Manor, NY (US); Lidia Mangu, Yorktown Heights, NY (US); Michael A. Picheny, White Plains, NY (US); George A. Saon, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/750,604

(22) Filed: Jun. 25, 2015

(65) Prior Publication Data

US 2016/0267907 A1 Sep. 15, 2016

Related U.S. Application Data

(63) Continuation of application No. 14/644,817, filed on Mar. 11, 2015.

(51) Int. Cl.
*G10L 15/00* (2013.01)
*G10L 15/193* (2013.01)
*G10L 15/08* (2006.01)

(52) U.S. Cl.
CPC ...... *G10L 15/193* (2013.01); *G10L 2015/085* (2013.01); *G10L 2015/088* (2013.01)

(58) Field of Classification Search
None
See application file for complete search history.

(56) References Cited

U.S. PATENT DOCUMENTS

| | | | | |
|---|---|---|---|---|
| 6,275,801 B1* | 8/2001 | Novak | ................... | G10L 15/08 704/252 |
| 6,308,155 B1* | 10/2001 | Kingsbury | .............. | G10L 15/02 704/231 |
| 6,868,383 B1* | 3/2005 | Bangalore | .......... | G06K 9/00355 704/251 |
| 7,257,575 B1* | 8/2007 | Johnston | ............. | G06F 17/2247 |
| 7,831,425 B2* | 11/2010 | Acero | ..................... | G10L 15/05 704/231 |

(Continued)

OTHER PUBLICATIONS

NIST, "The Spoken Term Detection (STD) 2014 Evaluation Plan," http://www.nist.gov/itl/iad/mig/openkws2014.cfm, Feb. 2014, 25 pages.

(Continued)

*Primary Examiner* — Marivelisse Santiago Cordero
*Assistant Examiner* — Kevin Ky
(74) *Attorney, Agent, or Firm* — Alexa L. Ashworth; Ryan, Mason & Lewis, LLP

(57) ABSTRACT

A method for spoken term detection, comprising generating a time-marked word list, wherein the time-marked word list is an output of an automatic speech recognition system, generating an index from the time-marked word list, wherein generating the index comprises creating a word loop weighted finite state transducer for each utterance, i, receiving a plurality of keyword queries, and searching the index for a plurality of keyword hits.

20 Claims, 4 Drawing Sheets

(56) References Cited

U.S. PATENT DOCUMENTS

| | | | |
|---|---|---|---|
| 8,650,029 B2 | 2/2014 | Thambiratnam et al. | |
| 2003/0046087 A1* | 3/2003 | Johnston | G06F 3/017 704/275 |
| 2007/0192104 A1* | 8/2007 | Blewett | G10L 15/28 704/256 |
| 2007/0265826 A1* | 11/2007 | Chen | G06F 17/2818 704/2 |
| 2009/0030894 A1* | 1/2009 | Mamou | G10L 15/26 |
| 2010/0217596 A1* | 8/2010 | Morris | G10L 15/10 704/251 |
| 2014/0188475 A1 | 7/2014 | Lev-Tov et al. | |
| 2014/0223310 A1* | 8/2014 | Divay | G10L 15/22 715/727 |
| 2015/0154955 A1* | 6/2015 | Ma | G10L 15/08 704/257 |
| 2016/0098986 A1* | 4/2016 | Hofer | G10L 15/083 704/243 |

OTHER PUBLICATIONS

L. Mangu et al., "Finding Consensus in Speech Recognition: Word Error Minimization and Other Applications of Confusion Networks," Computer Speech & Language, Oct. 2000, pp. 373-400, vol. 14, No. 4.
C. Chelba et al., "Retrieval and Browsing of Spoken Content," IEEE Signal Processing Magazine, May 2008, pp. 39-49, vol. 25, No. 3.
D. Can et al., "Lattice Indexing for Spoken Term Detection," IEEE Transactions on Audio, Speech, and Language Processing, Nov. 2011, pp. 2338-2347, vol. 19, No. 8.
M. Saraclar et al., "Lattice-Based Search for Spoken Utterance Retrieval," Conference of the North American Chapter of the Association for Computational Linguistics: Human Language Technologies (NAACL/HLT), 2004, pp, 129-136.
C. Parada et al., "Query-By-Exampie Spoken Term Detection for OOV Terms," IEEE Workshop on Automatic Speech Recognition & Understanding (ASRU), Nov.-Dec. 2009, pp. 404-409, Merano, Italy.
P. Yu et al., "A Hybrid Word/Phoneme-Based Approach for Improved Vocabulary-Independent Search in Spontaneous Speech," INTERSPEECH—8th International Conference on Spoken Language Processing (ICSLP), Oct. 2004, pp. 293-296, Jeju Island, Korea.
T. Hori et al., "Open-Vocabulary Spoken Utterance Retrieval Using Confusion Networks," IEEE International Conference on Acoustics, Speech and Signal Processing (ICASSP), Apr. 2007, pp. IV-73-IV-76, Honolulu, Hawaii.
V.T. Turunen et al., "Indexing Confusion Networks for Morph-Based Spoken Document Retrieval," Proceedings of the 30th Annual International ACM SIGIR Conference on Research and Development in Information Retrieval, Jul. 2007, pp. 631-638, Amsterdam, The Netherlands.
Keith Vertanen, "Combining Open Vocabulary Recognition and Word Confusion Networks," IEEE International Conference on Acoustics, Speech and Signai Processing (ICASSP), Mar.-Apr. 2008, pp. 4325-4328.
S. Nakagawa et al., "A Robus/Fast Spoken Term Detection Method Based on a Sylable n-gram Index with a Distance Metric," Speech Communication, Impact Factor: 1.55, Mar. 2013, pp. 470-485, vol. 55, No. 3.
"IARPA Broad Agency Announcement IARPA-BAA-11-02," IARPA Incisive Analysis Office, Apr. 2011, 46 pages.
J. Cui et al., "Automatic Keyword Selection for Keyword Search Development and Tuning" IEEE Intenational Conference on Acoustic, Speech and Signal Processing (ICASSP), May 2014, pp. 7889-7893, Florence, Italy.
NIST, "The Spoken Term Detection (STD) 2006 Evaluation Plan," http://www.nist.gov/speech/tests/std/, Sep. 2006, 13 pages.
H. Soltau et al., "The IBM Attila Speech Recognition Toolkit," IEEE Spoken Language Technology Workshop (SLT), Dec. 2010, pp. 97-102.
K. Laskowski et al., "The Fundamental Frequency Variation Spectrum," Proceedings of FONETIK, Jun. 2008, pp. 29-32.
F. Metze et al., "Models of Tone for Tonal and Non-Tonal Languages," IEEE Workshop on Automatic Speech Recognition and Understanding (ASRU), Dec. 2013, pp. 261-266, Olomouc, Czech Republic.
B. Kingsbury et al., "Lattice-Based Optimization of Sequence Classification Criteria for Neural-Network Acoustic Modeling," IEEE International Conference on Acoustics, Speech and Signal Processing (ICASSP), Apr. 2009, pp. 3761-3764, Taipei, Taiwan.
H. Soltau et al., "Dynamic Network Decoding Revisited," IEEE Workshop on Automatic Speech Recognition & Understanding (ASRU), Nov.-Dec. 2009, pp. 276-281, Merano, Italy.
L. Mangu et al., "Efficient Spoken Term Detection Using Confusion Networks," IEEE International Conference on Acoustics, Speech and Signal Processing (ICASSP), May 2014, pp. 7894-7898, Florence, Italy.
M. Saraclar et al., "An Empirical Study of Confusion Modeling in Keyword Search for Low Resource Languages," IEEE Workshop on Automatic Speech Recognition and Understanding (ASRU), Dec. 2013, pp. 464-469, Olomouc, Czech Republic.
G. Chen et al., "Using Proxies for OOV Keywords in the Keyword Search Task," IEEE Workshop on Automatic Speech Recognition and Understanding (ASRU), Dec. 2013, pp. 416-421, Olomouc, Czech Republic.
C. Allauzen et al., "OpenFst: A General and Efficient Weighted Finite-State Transducer Library (Extended Abstract of an Invited Talk)," Proceedings of the Ninth International Conference on Implementation and Application of Automata (CIAA), Lecture Notes in Computer Science, Jul. 2007, pp, 11-23, vol. 4783.
L. Mangu et al., "Exploiting Diversity for Spoken Term Detection," IEEE International Conference on Acoustics, Speech and Signal Processing (ICASSP), May 2013, pp. 8282-8286, Vancouver, British Columbia, Canada.
B. Kingsbury et al., "A High-Performance Cantonese Keyword Search System," IEEE International Conference on Speech and Signal Processing (ICASSP), May 2013, pp. 8277-8281.
U.V. Chaudhari et al., "Matching Criteria for Vocabulary-Independent Search," IEEE Transactions on Audio, Speech, and Language Processing, Impact Factor: 2.63, Jul. 2012, pp. 1633-1643. vol. 20, No. 5.
L. Mangu et al., "The IBM Keyword Search System for the DARPA RATS Program," IEEE Workshop on Automatic Speech Recognition and Understanding (ASRU), Dec. 2013, pp. 204-209, Olomouc, Czech Republic.
V. Valtchev et al., "Lattice-Based Discriminative Training for Large Vocabulary Speech Recognition," IEEE International Conference on Acoustics, Speech, and Signal Processing (ICASSP), May 1996, pp. 605-608, vol. 2.
C. Collins et al., "Visualization of Uncertainty in Lattices to Support Decision-Making," Proceedings of the 9th Joint Eurographics/IEEE Visualization and Graphics Technical Committee (VGTC) Symposium on Visualization, May 2007, pp. 51-58, Norrköping, Sweden.
Y. Shan et al., "Phone Lattice Reconstruction for Embedded Languaae Recognition in LVCSR," EURASIP Journal on Audio, Speech, and Music Processing, Apr. 2012, 13 pages., vol. 15.
J. Shao et al., "Fast Vocabulary-Independent Audio Search Based on Syllable Confusion Network Indexing in Mandarin Spontaneous Speech," Second International Conference on Digital Telecommunications (ICDT), Jul. 2007, 6 pages.
Jon Heggland, "OntoLog: Flexible Management of Semantic Video Content Annotations," Doctoral Thesis for the Degree of Doktor Ingenhør, Norwegian University of Science and Technology, Faculty of Information Technology, Mathematics and Electrical Engineering, Sep. 2005, 254 pages, Trondheim, Norway.
Y. Xu et al., "Spoken Term Detection for OOV Terms Based on Phone Fragment," International Conference on Audio, Language and Image Processing (ICALIP), Jul. 2012, pp. 1031-1034, Shanghai, China.

(56) References Cited

OTHER PUBLICATIONS

U.S. Appl. No. 14/230,790, filed in the name of Brian E.D. Kingsbury et al. on Mar. 31, 2014, and entitled "Method and System for Efficient Spoken Term Detection Using Confusion Networks,".
List of IBM Patents or Patent Applications Treated as Related.

* cited by examiner

100

200

300

400

METHOD AND SYSTEM FOR ORDER-FREE SPOKEN TERM DETECTION

CROSS-REFERENCE TO RELATED APPLICATION

This application is a Continuation of U.S. patent application Ser. No. 14/644,817, filed on Mar. 11, 2015, the disclosure of which is incorporated herein by reference in its entirety.

This invention was made with Government support under Contract No. W911NF-12-C-0012 awarded by the Department of Defense (DOD). The Government has certain rights to this invention.

TECHNICAL FIELD

The field generally relates to systems and methods for spoken term detection and, in particular, systems and methods for order-free spoken term detection

BACKGROUND

Finding a target term in an audio corpus is one of the fundamental problems in automatic speech processing. Given the vast amount of existing spoken information, there is an increasing need for small indices and fast search. Typically, known spoken term detection (STD) systems search for terms in an index built from the output of an automatic speech recognition (ASR) system. The ASR output representation is the 1-best hypothesis, and using it for indexing results in good STD performance if the ASR system has low word error rate. However, many known STD systems, which may have to deal with degraded inputs, can benefit from using a richer ASR output representation. Lattices and confusion networks (CNs) are two used representations of multiple hypotheses from an ASR system, and have been used for building STD indices. The lattice approach requires large disk space to store an index. Although CNs require less disk space, CN computation can be prohibitive for large lattices.

SUMMARY

In general, exemplary embodiments of the invention include systems and methods for spoken term detection and, in particular, systems and methods for order-free spoken term detection.

Embodiments of the present invention use Time-Marked Word (TMW) lists as a replacement for lattices and CNs used as indexing vehicles for STD. In a TMW list, candidates are tagged with posterior probabilities and time information, and stored as a large list of words. The TMW list does not use the additional word ordering present in a lattice or CN. TMW lists compactly summarize a large ASR search space. Representing a large search space can be critical for STD metrics such as actual term-weighted value (ATWV) that heavily penalize misses of rare keywords. As set forth below in experimental examples, comparisons on the Open-KWS 2014 Tamil limited language pack task show that the TMW-based indexing results in better performance than conventional methods, while being faster and having a smaller footprint.

According to an exemplary embodiment of the present invention, a method for spoken term detection, comprises generating a time-marked word list, wherein the time-marked word list is an output of an automatic speech recognition system, generating an index from the time-marked word list, wherein generating the index comprises creating a word loop weighted finite state transducer for each utterance, i, receiving a plurality of keyword queries, and searching the index for a plurality of keyword hits.

According to an exemplary embodiment of the present invention, a computer program product for spoken term detection, comprises a non-transitory computer readable storage medium having program instructions embodied therewith, the program instructions executable by a processor to cause the processor to perform the above method.

According to an exemplary embodiment of the present invention, an apparatus, for spoken term detection comprises a memory, and a processing device operatively coupled to the memory and configured to generate a time-marked word list, wherein the time-marked word list is an output of an automatic speech recognition system, generate an index from the time-marked word list, wherein generating the index comprises creating a word loop weighted finite state transducer for each utterance, i, receive a plurality of keyword queries, and search the index for a plurality of keyword hits.

BRIEF DESCRIPTION OF THE DRAWINGS

Exemplary embodiments of the present invention will be described below in more detail, with reference to the accompanying drawings, of which.

DETAILED DESCRIPTION OF EXEMPLARY EMBODIMENTS

Figure 1:
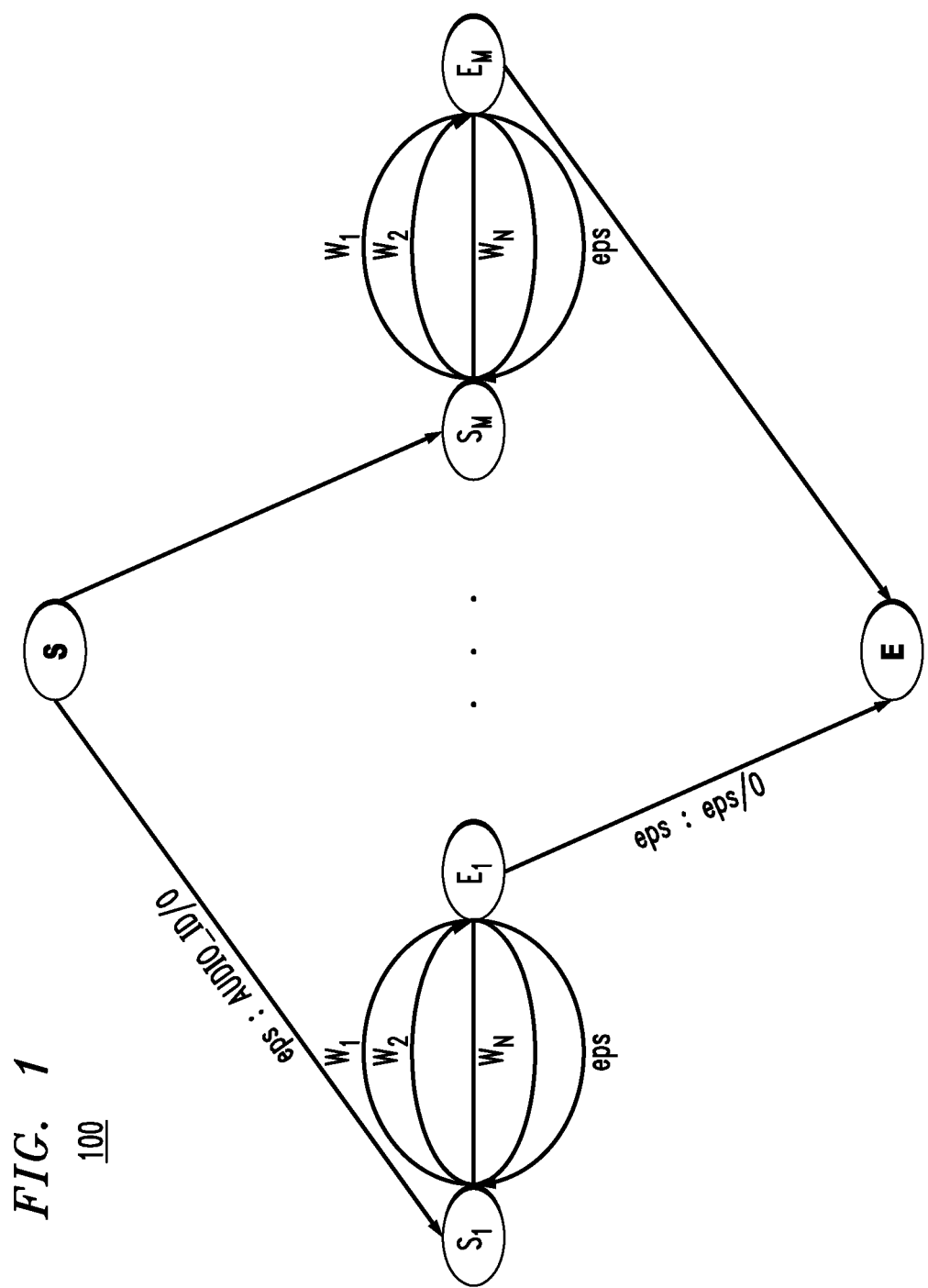
FIG. 1 shows a TMW-based index, in accordance with an exemplary embodiment of the present invention.

Exemplary embodiments of the invention will now be discussed in further detail with regard to systems and methods for spoken term detection and, in particular, systems and methods for order-free spoken term detection. This invention may, however, be embodied in many different forms and should not be construed as limited to the embodiments set forth herein.

As used herein, "word label" can refer to the word identity of an ASR hypothesis.

As used herein, "start and end times" can refer to the beginning and end times of hypothesized words.

As used herein, "posterior probabilities/scores" can refer to the probability of a hypothesized word for a given start and end time, given an entire observed acoustic sequence. For certain Weighted Finite State Transducer (WFST) operations, the probabilities are converted to the log domain.

As used herein, "zero-cost epsilon-arcs" can refer to links in a finite state transducer with <epsilon> input and output labels, and with cost=0.

As used herein, "full connectivity" can refer to all the nodes in a finite state transducer being connected.

As noted above, embodiments of the present invention use TMW lists as a replacement for lattices and CNs. TMW lists include a set of words with start and end times, and posterior scores. Unlike lattices and CNs, which explicitly represent word ordering in their topologies, TMW lists lack such structure, encoding word ordering implicitly in the time marks. The structural relationship between lattices or CNs and TMW lists can be explained as being like the structural relationship between a sentence and its bag-of-words representation. To accommodate the lack of explicit word-order information in the TMW lists, embodiments of the present invention utilize a Weighted Finite State Transducer (WFST) architecture for STD.

ASR Output Representations

Many speech recognition systems produce lattices or CNs to be used for STD indexing. Lattices are partially ordered networks of word hypotheses, with links in the networks carrying word identity, time information, language model (LM) and acoustic model (AM) scores. Posterior probabilities for the links in a lattice can be computed from the LM and AM scores using, for example, the Forward-Backward algorithm. CNs have a linear structure, representing the competing word hypotheses and their posterior probabilities in consecutive time intervals (referred to as confusion bins). CNs are produced from lattices through a 2-step process: (1) Intra-word clustering, in which the lattice arcs which have the same word label, and start and end time, are merged, and their posteriors summed up, and (2) Inter-word clustering, in which all the lattice arcs are clustered until the partial order becomes a total order, leading to the linear structure. CNs are orders of magnitude smaller than lattices, but they take extra time to compute. The inter-word clustering step can account for almost all, for example, 99%, of the computation time. To avoid this time-consuming step, embodiments of the present invention use a TMW list, which comprises the output of the intra-word clustering step, including an enumeration of word labels, start and end times, and posterior probabilities, (w,s,e,p).

According to an embodiment, silence, hesitations and other filler words are not written into this list. A lattice is computed in memory, but only the TMW list is produced on disk. In order to reduce the size of the TMW lists further, an embodiment of the present invention relaxes an exact time match constraint to allow for arcs with large overlap to merge as well. This disclosure reports results for exact match. An exact match time constraint refers to having two links in a TMW list having identical start and end times in order to merge the two links. In the relaxed constraint scenario, links can be merged that have less than 100% overlap, for example, links are merged which have 95% overlap.

Data and ASR System Description

The following includes a description of the task, metric, and ASR system used for indexing. In connection with the non-limiting illustrative experimental examples discussed below, experiments were conducted in the context of the IARPA Babel program, which focuses on spoken term detection for low-resource languages. In the non-limiting illustrative experimental examples, the STD task is defined by the National Institute of Standards and Technology (NIST®) in the OpenKWS14 Evaluation Plan. The limited language pack track (LP) of the program was chosen, in which only 20 hours of audio, (10 hours of transcribed data) is used for building ASR models and lexicons, making it arguably more interesting for out-of-vocabulary (OOV) keyword searches. The non-limiting illustrative experimental examples focus on the Tamil language, which was the OpenKWS 2014 evaluation task. The limited language pack includes a 20-hour development set (DEV). For these experiments two keyword sets were used: IBM-1, containing 1721 in-vocabulary (IV) queries and 654 OOV queries, and IBM-2, containing 1978 IV queries and 617 OOV queries, generated by International Business Machines (IBM®) and supplied to all OpenKWS participants.

The metric used for the Babel program is Term-Weighted Value (TWV), which was first used in the NIST® 2006 STD Evaluation. As shown in Tables 1, 3 and 4 set forth herein, keyword search performance is reported in terms of maximum Term-Weighted Value (MTWV), which is the best TWV for all values of a decision threshold, Optimal TWV (OTWV), which gives an upper-bound of the performance under perfect keyword-specific thresholding, and Supremum TWV (STWV), which gives an upper bound of the performance assuming perfect detection scores and thresholding.

The acoustic model used in the experimental examples is a collection of three deep neural networks (DNNs) which differ in the number of output states (1000, 2000, 3000). The DNNs take 9 consecutive frames as input where each frame is a concatenation of a 40-dimensional feature space maximum likelihood linear regression (fMLLR) vector and a 7-dimensional fundamental frequency variation (FFV) vector. Each DNN has 5 hidden layers with 1024 sigmoid units. During decoding, the output scores of the DNNs are combined at the frame level with equal weights. The training of the nets comprises (1) layer-wise discriminative pre-training using the cross-entropy criterion, (2) stochastic gradient training using back-propagation and the cross-entropy criterion, and (3) sequence discriminative training using stochastic gradient and the state-level minimum Bayes risk criterion. The dictionary has 14.1K words and 21.3K pronunciations. The language model (LM) is a trigram LM with modified Kneser-Ney smoothing trained only on the acoustic transcripts.

According to an embodiment, the lattices, CNs and TMW lists are produced using a dynamic decoder. The word error rates for the 1-best hypotheses from the lattices and confusion networks are 73.9% and 73.1%, respectively. For simplicity, the results are presented for this acoustic model only, which is the IBM® model with the best ATWV performance in the OpenKWS 14 evaluation. Similar improvements can be obtained for other acoustic models.

Indexing

In accordance with an embodiment of the present invention, the order-free method proposed for indexing TMW lists is described. An index containing necessary information for keyword searching (e.g., audio file identity, start time, end time, and word label) is constructed from a TMW list using the following steps.

1. For each utterance, i, a word loop WFST is created, which has $S_i$ as the start node, $E_i$ as the end node, and arcs from $S_i$ to $E_i$ for each item (w,s,e,p) in the TMW list. These arcs have w as the input label, (s,e) as the output label and −log(p) as the cost. $E_i$ is connected to $S_i$ by a zero-cost epsilon arc, thus creating a word loop.

2. The final single index is obtained by creating a new start node, S, that is connected to each $S_i$ by zero-cost arcs with input label epsilon and output label i (or audio file id), and a new end node, E, that is connected to each $E_i$ by zero-cost epsilon-arcs.

FIG. 1 shows a TMW-based index, in accordance with an embodiment of the present invention. The set of keywords that can be retrieved by this index is larger than the set of keywords that can be retrieved by a lattice index due to the full connectivity of the word components of the TMW-based index. A multi-word keyword might not be found in a lattice index if there is no path connecting the word components in the lattice. This can be a problem especially for large keywords. In the case of a CN-based index, which is already a much more connected structure than the lattice index, the TMW-based index allows for new sequences of words which might be missed in a CN due to an inter-word alignment error.

Although embodiments of the present invention provide an ASR system that outputs TMW lists instead of lattices and CNs, in the case the lattice and CN outputs already exist, alternative embodiments of the present invention convert the lattice and CN outputs to TMW lists, which are indexed in a similar fashion to TMW lists created instead of the lattices and CNs. According to an embodiment of the present invention, in the case of converting a CN output to a TMW list, epsilon arcs in a CN are ignored when creating the index, and only the words in a CN are used to obtain the word-loop index. The lattice-TMW list and CN-TMW list indexing is discussed further herein.

Search

According to embodiments of the present invention, each query is converted into a word automaton to search the index described in connection with FIG. 1. More specifically, a multi-word query containing N words is converted into an automaton with N links, each link having as a label the corresponding word. In-vocabulary (IV) query automata are directly composed with the word index transducer. For OOV searches, (1) queries can be converted to IV queries (proxies) using a phone confusability (P2P) transducer (see U.S. patent application Ser. No. 14/230,790, filed on Mar. 31, 2014, which is assigned to International Business Machines Corporation of Armonk, N.Y., USA, and titled "Method And System For Efficient Spoken Term Detection Using Confusion Networks," the complete disclosure of which is expressly incorporated herein by reference in its entirety for all purposes), and then composed with the word index, or (2) the index is converted to phone level by replacing all words with their pronunciations and is then searched via composition with phone automata. A phone automaton is generated by (1) converting an OOV word automaton to a phone automaton P using the lexicon, (2) composing P with P2P, and (3) extracting N-best paths. Both methods produce identical results, with the choice for which method to use depending on, for example, memory and computational constraints, as well as on the size of the vocabulary. The proxy method can result in a smaller index size and faster search. However, for large vocabulary sizes, the conversion of OOV queries to IV proxies is computationally and memory intensive, in which case the phonetic method may be preferred. For many tasks, the IV search can also benefit from expansion using a P2P transducer, in which case the indexing and search pipeline for all the queries will be the same, and only the degree of phonetic expansion (N-best) will differ (less expansion for IV queries).

Regardless of the type of composition, word-based or phone-based, the result of the composition, after projecting on the output label, is a list of hits for each query and the corresponding score. A hit contains the audio file id, as well as a sequence of start and end time pairs $(s_i, e_i)$ corresponding to the word components of a multi-word query "audio file id" $(s_1, e_1)$ $(s_2, e_2)$ ... $(s_n, e_n)$. In contrast to the previous lattice and CN-based WFST approaches, in which the start and end time pairs are ordered due to the structure of the index, when employing TMW lists, all the hits containing consecutive time pairs that are not ordered are eliminated. Two time pairs $(s_i, e_i)$ and $(s_{i+1}, e_{i+1})$ are ordered if $s_i < s_{i+1}$ and $s_{i+1} - e_i <$ thresh, where thresh is empirically determined. In other words, the start times have to be sorted in time, and the putative locations of the word components should not be far from each other. Note that $s_{i+1} - e_i$ could be negative if the two time pairs overlap. The final posting list includes the surviving hits, which have start time $s_1$ and end time $e_n$. In case there are two overlapping hits for a keyword, only the hit with the maximum score is kept. For each keyword, the scores below a threshold are normalized (e.g., using the methods described in U.S. patent application Ser. No. 14/230,790, referenced above), while high scores are kept intact.

Experimental Examples and Results

In non-limiting illustrative experimental examples, the OpenFST Library was used for both indexing and search. It is to be understood that there are many methods for creating the phone confusability transducer. For the OpenKWS evaluation a method was used that compares the Viterbi alignment of the training data transcripts to the decoded output to accumulate state-level confusions which are then converted to phone-level confusions.

As a baseline for the TMW based STD, known lattice and CN WFST STD architectures that were successfully deployed in both the DARPA RATS and IARPA Babel evaluations were used. In the lattice architecture, a word index built from lattices was used for IV search and a phone index was used for OOV search, after the OOV queries were expanded using the P2P transducer. In the CN approach, a word index built from CNs was used for both IV and OOV searching. All queries were mapped to IV proxies after expansion with the P2P transducer. The same confusability transducer was used for all approaches, and the same degree of expansion for IV (N-best=2000) and OOV queries (N-best=20000) was used. Table 1 and Table 2 set forth below show the performance, index size and computational time for TMW lists, CNs, and lattices produced by the acoustic model described above.

TABLE 1

Comparison of STD performance

| System | MTWV | OTWV | STWV |
|---|---|---|---|
| Lattice STD | 0.1503 | 0.2723 | 0.4625 |
| CN STD | 0.1518 | 0.2810 | 0.4912 |
| TMW STD | 0.1549 | 0.2883 | 0.5116 |

TABLE 2

Comparison of size and computational times

| System | Index Size | Time to produce |
|---|---|---|
| Lattice | 21G | 82 hours |
| CN | 100M | 124 hours |
| TMW | 295M | 80 hours |

It can be seen that TMW STD has the best MTWV, OTWV, and STWV, requires the least amount of time for index generation, and produces a smaller index than lattice STD. While CN STD has an even smaller index size, if decoding beams for CN STD are increased to match the TMW STD index size, the CN STD performance is still worse (MTWV=0.1525) and the time to produce the CN STD index increased by 20%.

The difference between order-free indexing and structured indexing for a given ASR output type was also investigated. Order-free indexing based on lattices (lattice-TMW) is a matter of converting lattices to TMW lists and then applying TMW indexing and search. This can be identical to TMW STD, except that the lattices have been written to disk. For order-free indexing based on CNs (CN-TMW), TMW lists are created by extracting the words with time information and their posterior probabilities from CNs, and then applying TMW indexing and search. The comparison between lattice STD and lattice-TMW STD is made in Table 1, while the comparison between CN STD and CN-TMW STD is made in Table 3 set forth below. Even if CNs are used as an intermediate representation, order-free indexing improves STD performance.

TABLE 3

Comparison of CN indexing methods

| System | MTWV | OTWV | STWV |
|---|---|---|---|
| CN STD | 0.1518 | 0.2810 | 0.4912 |
| CN-TMW STD | 0.1525 | 0.2993 | 0.5001 |

The STD results above are obtained using the same ASR decoding parameters, namely the ASR decoding parameters used in the evaluation. For the ATWV metric it is very important that rare words are not missed; therefore, better performance can be achieved if the index is rich enough to contain instances of those words, even if the scores are low. If the only hit for a word has a very low score, after normalization this score becomes 1, and will survive any thresholding. Given that TMW lists are much smaller than lattices and faster to produce than CNs, increasing the decoding beams and thus pruning fewer hypotheses can be afforded. As seen in Table 4 set forth below, with an index that is 150 times smaller, better performance is obtained.

TABLE 4

Comparison for larger ASR decoding beams

| System | MTWV | Index Size |
|---|---|---|
| Lattice STD | 0.1553 | 149G |
| TMW STD | 0.1602 | 1G |

Figure 2:
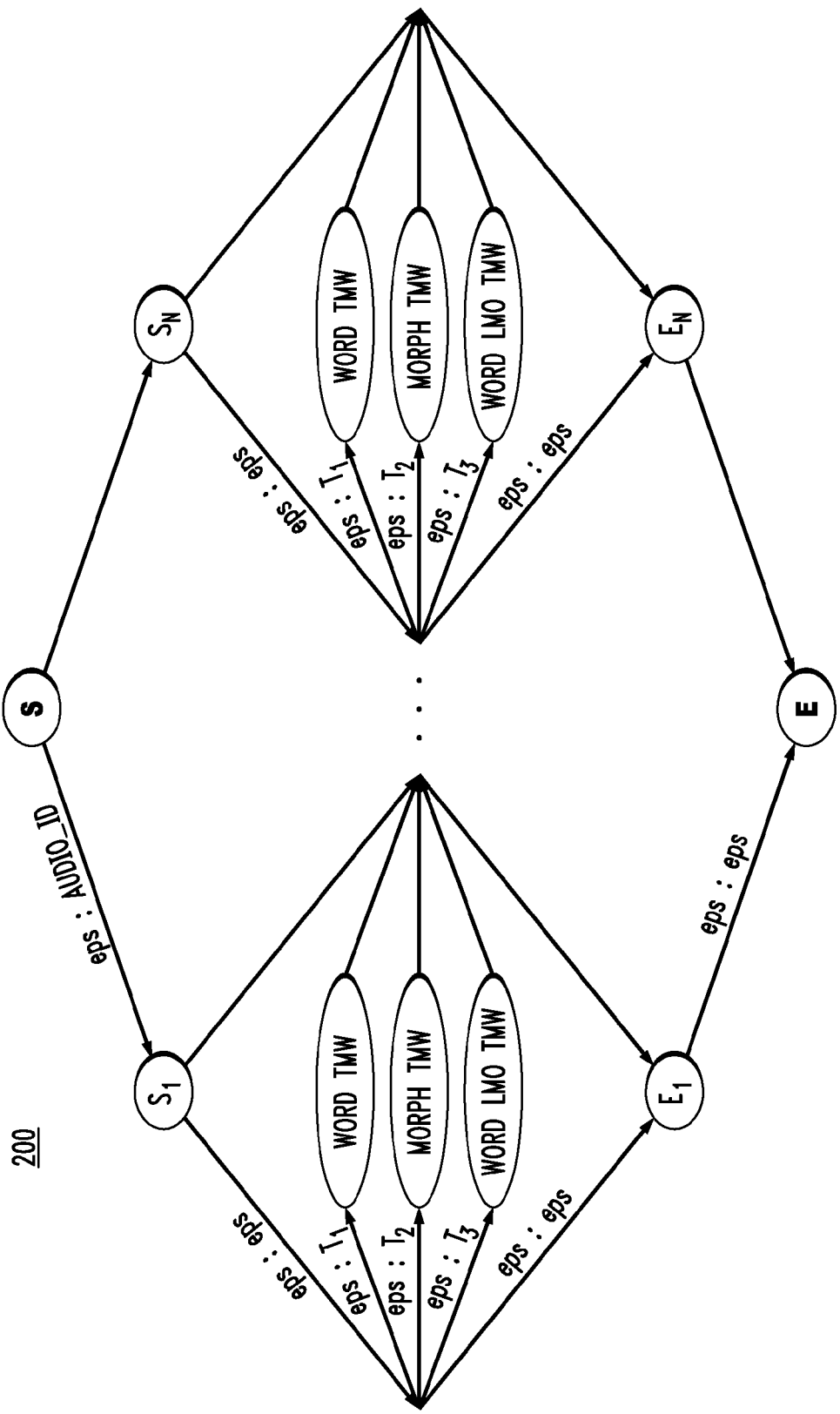
FIG. 2 shows the architecture of an index that can be used for parallel searching, in accordance with an exemplary embodiment of the present invention.

In all the above experiments, indexing is based on word ASR decoding. However, the embodiments of the present invention are not limited thereto. For example, another evaluation system, in accordance with an embodiment of the present invention, can use three indexes: (1) word-based, (2) word-based but with no language model scores, and (3) morph-based. For each query, searching in the three indexes is performed simultaneously and the results are merged. According to an embodiment of the present invention, FIG. 2 shows the architecture of an index that can be used for this parallel search. The labels $T_1$, $T_2$, $T_3$ identify the sub-index that produces a given hit in the resulting posting list. These identifiers are needed due to the different merging strategies used in case of overlapping hits. For hits coming from the same sub-index, only the maximum scoring hit is kept, while for hits coming from different sub-indexes, the scores are totaled. As seen in Table 5 set forth below, parallel indexing and search results in 40% relative improvement in ATWV, and this improvement holds when TMW STD is used instead of CN STD.

TABLE 5

Comparison of parallel STD architecture for CN STD and TMW STD

| System | MTWV |
|---|---|
| CN STD | 0.2194 |
| TMW STD | 0.2210 |

Comparisons only against CN STD are shown because this was the system that was submitted in the OpenKWS evaluation. TMW STD can be especially beneficial for parallel indexing and search. Given the complex structure of a parallel index, it is important to have small sub-indexes which can also be produced quickly.

As noted herein, embodiments of the present invention provide (TMW) lists as input for STD indexing, and as a replacement for lattices and CNs. TMW lists are much smaller than lattices, and faster to compute than CNs. To accommodate for a lack of explicit word-order information in the TMW lists, embodiments of the present invention provide a new word-loop FST architecture for STD. The burden of insuring that the words in a multi-word query are correctly ordered in an STD hit is transferred from the indexing step to the search step. While previously the index encoded this information, causing the index to be large (lattices) or slower to produce (CNs), the current approach simply imposes an efficient time order test during search. According to an embodiment of the present invention, the proposed STD architecture can be applied to lattices and CNs by converting the lattices and CNs to TMW lists. For example, TMW lists are created after creating a lattice in memory, which for computation of word posterior probabilities.

Figure 3:
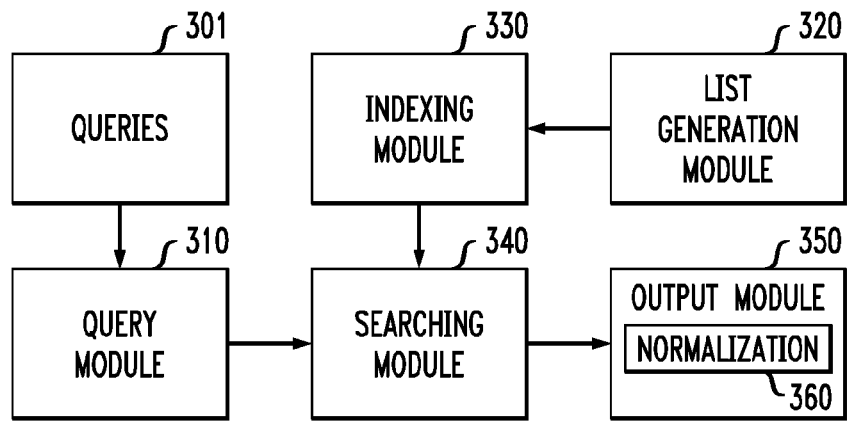
FIG. 3 is high-level diagram showing detail of a system for spoken term detection, according to an exemplary embodiment of the invention.

FIG. 3 shows the proposed system architecture, in accordance with an embodiment of the present invention. As shown in FIG. 3 by lines and/or arrows, the components of the system 300 are operatively coupled to each other via, for example, physical connections, such as wired and/or direct electrical contact connections, and wireless connections, such as, for example, WiFi, BLUETOOTH®, IEEE 802.11, and/or networks, including but not limited to, a local area network (LAN), wide area network (WAN), cellular network, satellite network or the Internet.

The system 300 for spoken term detection, comprises a query module 310 capable of receiving keyword queries 301, for example, phone level OOV keyword queries and IV keyword queries. In accordance with an embodiment of the present invention, the system 300 includes a list generation module 320 comprising, for example, an ASR system including an ASR decoder, which generates a TMW list. The TMW list comprises the output of intra-word clustering, including an enumeration of word labels, start and end times, and posterior probabilities, (w,s,e,p). As noted above, according to an embodiment, silence, hesitations and other filler words are not written into this list. A lattice is computed in memory, but only the TMW list is produced on disk, and to reduce the size of the TMW lists, an embodiment of the present invention relaxes an exact time match constraint to allow for arcs with large overlap to merge as well.

The TMW list is sent to an indexing module 330. The indexing module 330 generates an index like that shown in FIG. 1 from a TMW list. The index includes necessary information for keyword searching (e.g., audio file identity, start time, end time, and word label) and is constructed from the TMW list using the steps for indexing described above. For each utterance, the indexing module 330 creates a word loop WFST as explained hereinabove, which has $S_i$ as the start node, $E_i$ as the end node, and arcs from $S_i$ to $E_i$ for each item (w,s,e,p) in the TMW list. The indexing module 330 generates a final single index by creating a new start node, S, that is connected to each $S_i$ by zero-cost arcs with input label epsilon and output label i (or audio file id), and a new end node, E, that is connected to each $E_i$ by zero-cost epsilon-arcs.

A search module 340 receives the queries from the query module 310, and converts each query into a word automaton to search the index described in connection with FIG. 1. As noted above, IV query automata are directly composed with the word index transducer, and for OOV searches, queries can be converted to IV queries (proxies) using a phone confusability (P2P) transducer, and then composed with the word index, or (2) the index is converted to phone level by replacing all words with their pronunciations and is then searched via composition with phone automata. The search module 340 generates a phone automaton by (1) converting an OOV word automaton to a phone automaton P using the lexicon, (2) composing P with P2P, and (3) extracting N –best paths.

Regardless of the type of composition, word-based or phone-based, the search module outputs to an output module 350, a list of hits for each query and a corresponding score. As noted above, a hit contains the audio file id, as well as a sequence of start and end time pairs $(s_i,e_i)$ corresponding to the word components of a multi-word query "audio file id" $(s_1,e_1) (S_2,e_2) \ldots (s_n,e_n)$. The output module 350 eliminates all the hits containing consecutive time pairs that are not ordered, and orders two time pairs $(s_i,e_i)$ and $(s_{i+1},e_{i+1})$ if $s_i<s_{i+1}$ and $s_{i+1}-e_i<$thresh, where thresh is empirically determined. The final posting list provided by the output module 350 includes the surviving hits, which have start time $s_1$ and end time $e_n$. In case there are two overlapping hits for a keyword, the output module 350 keeps only the hit with the maximum score. The output module 350 includes a normalization component 360, which normalizes the scores below a threshold for each keyword, while keeping the high scores intact.

Figure 4:
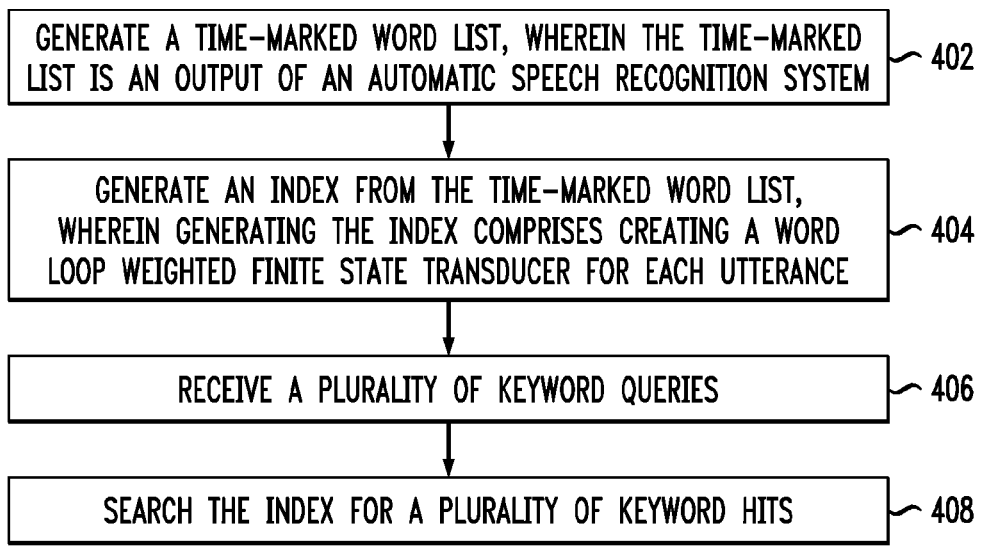
FIG. 4 is a flow diagram illustrating a method for spoken term detection, in accordance with an exemplary embodiment of the present invention.

FIG. 4 is a flow diagram illustrating a method for spoken term detection, in accordance with an exemplary embodiment of the present invention. The method for spoken term detection 400 comprises generating a TMW list, wherein the time-marked list is an output of an ASR system (block 402). The TMW list includes an enumeration of word labels, start and end times, and posterior probabilities. In accordance with an embodiment, generating the TMW list may comprise converting a lattice output or a confusion network output to the TMW list.

The method 400 further comprises generating an index from the TMW list, wherein generating the index comprises creating a word loop WFST for each utterance, i (block 404). In accordance with an embodiment of the present invention, the word loop WFST includes $S_i$ as a start node, $E_i$ as an end node, and arcs from $S_i$ to $E_i$ for each word label, start and end time, and posterior probability (w,s,e,p) in the TMW list. Each arc has w as an input label, (s,e) as an output label and –log(p) as a cost. $E_i$ is connected to $S_i$ by a zero-cost epsilon arc. Generating the index may further comprise creating a new start node, S, that is connected to each $S_i$ by zero-cost arcs with input label epsilon and output label i, and creating a new end node, E, that is connected to each $E_i$ by zero-cost epsilon-arcs.

According to an embodiment, the index may comprise a plurality of indexes that are simultaneously searched. The plurality of indexes can comprise at least two of a word-based index, a word-based index with no language model scores, and a morph-based index.

The method 400 further comprises receiving a plurality of keyword queries (block 406), and searching the index for a plurality of keyword hits (block 408). Searching can comprise converting each query of the plurality of keyword queries into a word automaton to search the index. According to an embodiment, a keyword hit may include an audio file id, a sequence of start and end time pairs $(s_i,e_i)$ corresponding to word components of a multi-word query audio file id $(s_1,e_1) (s_2,e_2) \ldots (s_n,e_n)$.

The method may further comprise eliminating all hits containing consecutive time pairs that are not ordered, wherein two time pairs $(s_i,e_i)$ and $(s_{i+1},e_{i+1})$ are ordered if $s_i<s_{i+1}$ and $s_{i+1}-e_i<$thresh, where thresh is empirically determined.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
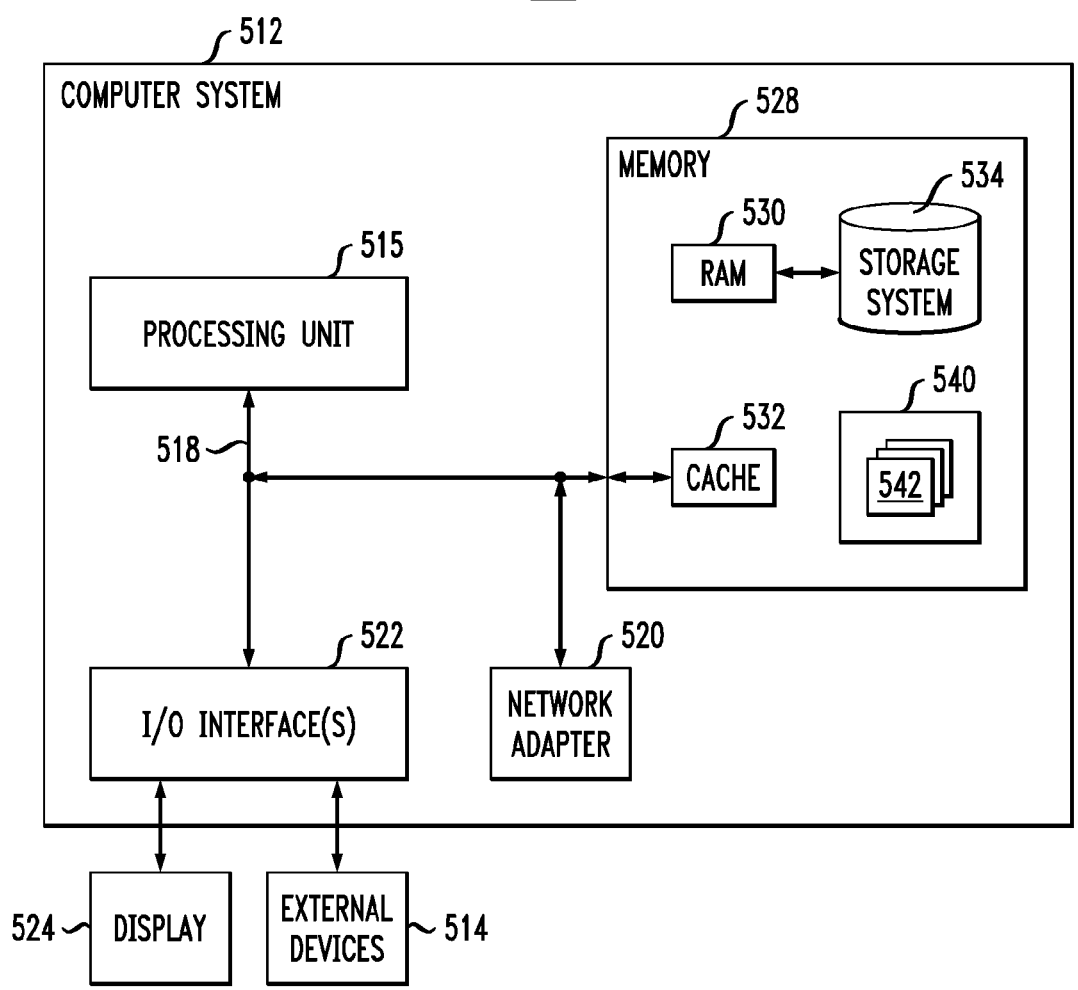
FIG. 5 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 5, in a computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

The bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 512 typically includes a variety of computer system readable media. Such media may be any available media that is accessible by computer system/server 512, and it includes both volatile and non-volatile media, removable and non-removable media.

The system memory 528 can include computer system readable media in the form of volatile memory, such as random access memory (RAM) 530 and/or cache memory 532. The computer system/server 512 may further include other removable/non-removable, volatile/nonvolatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 518 by one or more data media interfaces. As depicted and described herein, the memory 528 may include at least one program product having a set (e.g., at least one) of program modules that are configured to carry out the functions of embodiments of the invention. A program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc., one or more devices that enable a user to interact with computer system/server 512, and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer program product comprising a non-transitory computer readable storage medium having program instructions embodied therewith, the program instructions executable by a processor to cause the processor to perform a method comprising:
generating a time-marked word list of an automatic speech recognition system, wherein generating the time-marked word list comprises converting an indexing structure into an output, and wherein the time-marked word list comprises the output;
generating an index from the time-marked word list, wherein generating the index comprises creating a word loop weighted finite state transducer for each utterance, i, of a plurality of utterances;
receiving a plurality of keyword queries; and
searching the index for a plurality of keyword hits;
wherein the word loop weighted finite state transducer for each utterance, i, of the plurality of utterances, includes $S_i$ as a start node, $E_i$ as an end node, without a start node or an end node between $S_i$ and $E_i$ and a plurality of arcs connected between an $S_i$ to $E_i$ pair for each utterance, the plurality of arcs corresponding to each word label, start and end time, and posterior probability in the time-marked word list.

2. The computer program product according to claim 1, wherein the time-marked word list includes an enumeration of the word labels, the start and end times, and the posterior probabilities.

3. The computer program product according to claim 1, wherein generating the index further comprises:
creating a new start node, S, that is connected to each $S_i$ by zero-cost arcs with input label epsilon and output label i; and
creating a new end node, E, that is connected to each $E_i$ by zero-cost epsilon-arcs, wherein each $S_i$ to $E_i$ pair is connected by the plurality of arcs.

4. The computer program product according to claim 1, wherein $E_i$ is connected to $S_i$ by a zero-cost epsilon arc.

5. The computer program product according to claim 1, wherein each arc has a word label W as an input label, a start time and an end time (s,e) as an output label and −log of a posterior probablitiy (−log(p)) as a cost.

6. The computer program product according to claim 1, wherein the indexing structure comprises one of a lattice output and a confusion network output.

7. The computer program product according to claim 1, wherein searching the index for a plurality of keyword hits comprises converting each query of the plurality of keyword queries into a word automaton to search the index.

8. The computer program product according to claim 7, wherein the plurality of keyword of queries comprises at least one multi-word query comprising a plurality of words.

9. The computer program product according to claim 8, wherein the word automaton converted from the multi-word query comprises a plurality of links, and wherein each link corresponds to a respective word of the multi-word query.

10. The computer program product according to claim 7, wherein the searching comprises an in-vocabulary (IV) search, and directly composing the word automaton with a word index transducer.

11. The computer program product according to claim 1, wherein a keyword hit includes an audio file id, a sequence of start and end time pairs $(s_i,e_i)$ corresponding to word components of a multi-word query audio file id $(s_1,e_1)$ $(s_2,e_2) \ldots (s_n,e_n)$.

12. The computer program product according to claim 1, wherein the method further comprises eliminating all hits containing consecutive time pairs that are not ordered.

13. The computer program product according to claim 12, wherein two time pairs $(s_i,e_i)$ and $(s_{i+1},e_{i+1})$ are ordered if $s_i<s_{i+1}$ and $s_{i+1}-e_i<thresh$, where thresh is empirically determined.

14. The computer program product according to claim 1, wherein the index comprises a plurality of indexes that are simultaneously searched.

15. The computer program product according to claim 14, wherein the plurality of indexes comprise at least two of a word-based index, a word-based index with no language model scores, and a morph-based index.

16. The computer program product according to claim 1, wherein converting the indexing structure into the output comprises performing an intra-word clustering step, and wherein performing the intra-word clustering step comprises merging lattice arcs of a lattice having an identical word label, and summing up posterior probabilities of the merged lattice arcs.

17. The computer program product of claim 16, wherein each merged lattice arc has at least a substantially similar start time and end time.

18. The computer program product according to claim 1, wherein the searching comprises an out-of-vocabulary (OOV) search, converting the plurality of keyword queries to respective in-vocabulary (IV) queries, and performing a word-based composition based on the conversion.

19. The computer program product according to claim 1, wherein the searching comprises an out-of-vocabulary (OOV) search, converting the index to a phone level by replacing all words with respective pronunciations, and performing a phone-based composition based on the conversion.

20. An apparatus, comprising:
a memory; and
a processing device operatively coupled to the memory and configured to:
generate a time-marked word list of an automatic speech recognition system, wherein the time-marked word list is generated by converting an indexing structure into an output, and wherein the time-marked word list comprises the output;
generate an index from the time-marked word list, wherein generating the index comprises creating a word loop weighted finite state transducer for each utterance, i, of a plurality of utterances;
receive a plurality of keyword queries; and
search the index for a plurality of keyword hits;
wherein the word loop weighted finite state transducer for each utterance, i, of the plurality of utterances, includes $S_i$ as a start node, $E_i$ as an end node, without a start node or an end node between $S_i$ and $E_i$, and a plurality of arcs connected between an $S_i$ to $E_i$ pair for each utterance, the plurality of arcs corresponding to each word label, start and end time, and posterior probability in the time-marked word list.

* * * * *